E. CARVER.
Saw Gin.
No. 3,521.
Patented April 4, 1844.
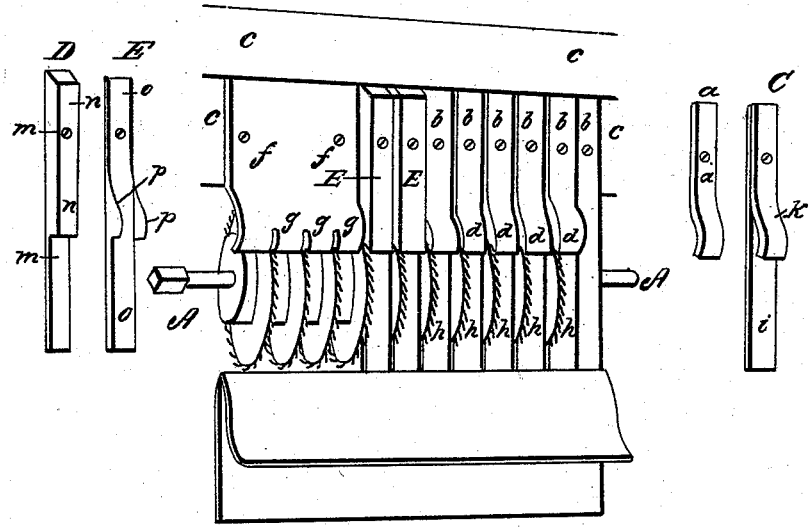
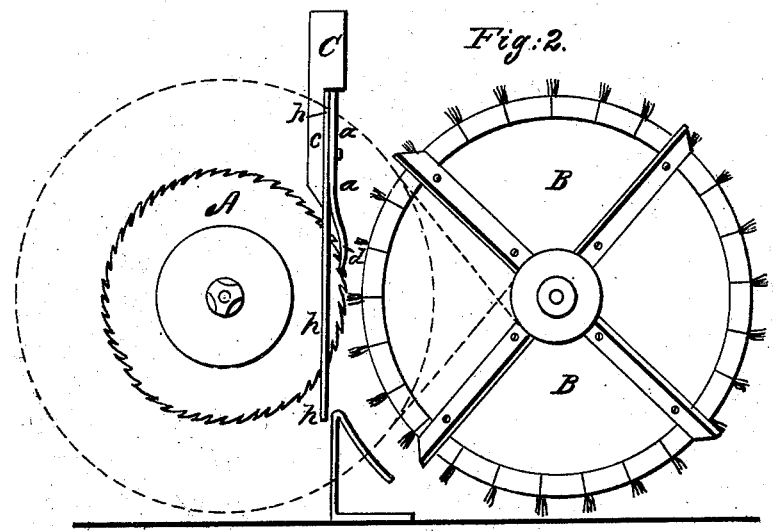

UNITED STATES PATENT OFFICE.

ELEAZER CARVER, OF BRIDGEWATER, MASSACHUSETTS.

IMPROVEMENT IN SAW-GINS FOR GINNING COTTON.

Specification forming part of Letters Patent No. 3,521, dated April 4, 1844.

*To all whom it may concern:*

Be it known that I, ELEAZER CARVER, of Bridgewater, in the county of Plymouth and State of Massachusetts, have invented a new and useful Improvement in Saw-Gins for Ginning Cotton; and I hereby declare the following to be a full and exact description thereof, reference being had to the annexed drawings, making part of this specification.

My improvement is designed to protect and hold the fibers of cotton while on the teeth of the saws in such a manner as to enable the brush to operate more perfectly in taking the cotton off from the teeth of the saws in loose and uniform quantities.

In the operation of the common gin, as the saw-cylinder revolves the teeth of the saws catch and draw the fibers of cotton away from the seeds through the grate, after which these fibers are swept or blown off from the teeth by a rapidly-revolving brush, and thrown out at the back side of the gin. These fibers, however, as they come through the grate aforesaid, are bent backward around the teeth of the saw, so that the loading of every tooth to some extent becomes intermixed and connected with the loading of each succeeding tooth, and they thus adhere together, insomuch that the brush is apt to take off or draw off from the saws more than it actually comes in contact with, and more than it should do in order to separate and straighten the fibers properly. This difficulty is also increased by the wind which is produced by the brush, which frequently loosens the cotton on the teeth of the saws before they have revolved far enough to come within the proper action of the brush, so that in the common gin the brush takes the cotton through the machine in too large masses, and in a doubled, connected, and improper state. In order, therefore, to prevent the fibers of cotton from being displaced or taken from the teeth of the saws till the brush can act properly upon them, so as to separate and straighten them while taking them off from the teeth, I use what I call a "guard," and which I describe as follows, reference being made to Figures 1 and 2 in the annexed drawings, to aid in the description.

Fig. 1 is a perspective view of the saw-cylinder and the guard attached to the gin. In this figure, A A is the saw-cylinder. Fig. 2 is an end elevation of the same, showing also an end view of the brush. In this figure, A is the saw-cylinder, and B B the brush.

I usually make this guard of thin strips of metal, $a$, Figs. 1 and 2, which are a little narrower at their lower ends, where the saws pass between them, than the spaces between the saws. They are placed vertically in the gin, as $b\ b\ b\ b\ b$, Fig. 1, and extend from end to end of the saw-cylinder. They are attached at their upper ends to the gin-frame $c\ c$, Figs. 1 and 2, or something fitted for that purpose, and extend downward between the saws and the brush, as seen in Fig. 2, till they come within about half an inch of the line where the brush first strikes the teeth of the saws. The lower ends of these strips then incline inward toward the saw-cylinder A, Fig. 2, and there terminate, so that the teeth of the saws and the cotton on them may be embraced slightly between the edges of the lower extremities of these strips, as shown at $d\ d\ d\ d$, Fig. 1, and at $d$, Fig. 2. When the guard is thus made and placed, it shuts off the current of air produced by the brush, so that the cotton on the teeth of the saw is undisturbed thereby till it arrives at the lower ends of the guard, and as it is there embraced slightly by the lower ends of the guard it is held lightly, so that the brush may perform its proper operation and detach the fibers from the teeth in small, uniform, and loose quantities. Various forms may be given to this guard to produce the same result, which are only modifications of the same invention, some of which I will now describe, as contemplated or used by me.

Instead of thin strips of metal having their lower extremities inclining inward, as above described, I sometimes use straight thick strips of wood or metal of the same length as the thin strips, and attach them to the gin in a similar way. In this case their lower ends embrace the cotton on the teeth of the saw without being bent or inclined inward, as shown at E E, Fig. 1; or, instead of being made in strips, as described above, the guard may consist of a single plate or plates of metal or other substances, attached at the upper edge and extending vertically down between the brush and the saws till it comes to the point before described, as is shown at $f\ f$, Fig. 1, the lower edge of the plate being made with narrow apertures or scores $g\ g\ g$, Fig. 1, through which the saw-teeth pass as they are loaded with cotton, and by which the cotton on the teeth is slightly embraced.

Guards made in either or any of the forms above described or contemplated may be used, either with or without the moting-grates, which are sometimes used in the gin, and which I will here describe. This moting-grate is used for the purpose of arresting and separating the motes from the cotton while the cotton is on the teeth of the saws. It consists of a number of thin bars placed vertically between the saw-cylinder and the brush, and is shown by $h\ h\ h$, Fig. 2, and which extend down and continue through between the saws, as is seen at $h\ h\ h$, Fig. 1, and also more distinctly in Fig. 2. When these moting-grates are used, the guard, if made in strips, as aforesaid, may be connected with and made part of the moting-grate, as is shown in Fig. 1, C, in which $i$ is the moting-grate, and $k$ is the guard; or the guard may be made by attaching thick pieces of any proper material to the back side of the bars of the moting-grate, which pieces should be of about the width of said bars and of a length and thickness sufficient to embrace that portion of the periphery of the saws which would otherwise be exposed above the point where the brush first strikes the teeth. This adjustment of the guard is seen at D, Fig. 1, where $m\ m$ is the moting-grate, and $n\ n$ the guard; or the guard may consist of fins extending along and attached to the edges of the bars of the moting-grate, and projecting out from the back side of these bars, so as to embrace that part of the periphery of the saws last referred to, and is seen at E, Fig. 1, in which $o\ o$ is the moting-grate, and $p\ p$ is the guard.

Having thus described my improvement, I now claim as my invention and desire to secure by Letters Patent—

The guard for protecting and holding the fibers of cotton while on the teeth of the saws, for the purposes herein set forth, and applied substantially in the manner herein described.

ELEAZER CARVER.

Witnesses:
  ARTEMAS HALE,
  CALEB S. HUNT.